US008818968B2

(12) United States Patent
Gandhi et al.

(10) Patent No.: US 8,818,968 B2
(45) Date of Patent: Aug. 26, 2014

(54) GENERIC LIFECYCLE MANAGEMENT OF ENTITY IN HIERARCHY ACCORDING TO STATUS

(75) Inventors: Unmesh Gandhi, Quebec (CA); Vladimir Kudryavtsev, Quebec (CA)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/551,418

(22) Filed: Jul. 17, 2012

(65) Prior Publication Data

US 2014/0025649 A1 Jan. 23, 2014

(51) Int. Cl.
*G06F 7/00* (2006.01)
*G06F 17/00* (2006.01)

(52) U.S. Cl.
USPC .......................................................... 707/694

(58) Field of Classification Search
None
See application file for complete search history.

(56) References Cited

U.S. PATENT DOCUMENTS

| | | | | |
|---|---|---|---|---|
| 2003/0195997 | A1* | 10/2003 | Ibert et al. | 709/318 |
| 2005/0114243 | A1* | 5/2005 | Scumniotales et al. | 705/35 |
| 2009/0146832 | A1* | 6/2009 | Ebert et al. | 340/825.49 |
| 2012/0054095 | A1* | 3/2012 | Lesandro et al. | 705/39 |

OTHER PUBLICATIONS

Electronic Desktop Application Navigator (EDAN) Training Manual Nov. 2007, Search and Information Resources Administration, 140 pages.*

Patent Automation Tips for OACS Auto-Count, May 26, 2011, USPTO, 1 page.*

IDS Presentation Handout Apr. 3, 2006, 31 pages.*

Manual of Patent Examining Procedure Jul. 2010, USPTO, 8th Ed. Rev. 8, http://www.uspto.gov/web/offices/pac/mpep/old/index.htm.*

Guidelines for Processing Office Actions in OACS Auto-Count Apr. 5, 2011, USPTO, 3 pages.*

IFW Business Processes and Procedures Section 2, Mar. 22, 2004, USPTO, Version 1.4, 59 pages.*

Rules of Practice Before the Board of Patent Appeals and Interferencerences in Ex Parte Appeals; Proposed Rule, Nov. 15, 2010, USPTO, Federal Register, 69828-69849.*

Motiejunas et al, Business Rules Manipulation Model 2007, Information Technology and Control, vol. 36 No. 3, pp. 295-301.*

* cited by examiner

*Primary Examiner* — Jason Liao

(74) *Attorney, Agent, or Firm* — Fountainhead Law Group PC

(57) ABSTRACT

Lifecycle of an entity residing within a hierarchy, may be managed according to corresponding status identifiers of a ruleset referenced by an engine. At design time, particular embodiments determine a finite set of fundamental statuses common to the entities, and covering the full lifecycle of each entity. A ruleset is created comprising rules accounting for each change in the status of the entity over its lifetime within the hierarchy. The status may be indicated by status identifiers, that in some embodiments are stored within a database. During runtime, an engine receives information from the entity. The engine references the ruleset including the status identifier information, and then propagates the status change of the entity to other entities in the same or different hierarchy levels based upon the ruleset. In this manner, the lifecycle of an entity within a hierarchy can be managed according to its status.

15 Claims, 27 Drawing Sheets

| Sender | Sender Status From | Sender Status To | Listner | Condition | Listner New Status |
|---|---|---|---|---|---|
| PROCESS | New | Ready | DELIVERY | ANY | Ready |
| PROCESS | Ready | In Process | DELIVERY | ANY | In Process |
| PROCESS | Ready | Canceled | DELIVERY | ANY | Canceled |
| PROCESS | Ready | On Hold - Process Definition (All Steps) | DELIVERY | ANY | On Hold - Process Definition (All Steps) |
| PROCESS | Ready | On Hold - Data Delivery Agreement (All Steps) | DELIVERY | ANY | On Hold - Data Delivery Agreement (All Steps) |
| PROCESS | Ready | On Hold - Process Definition (Subsequent Steps) | DELIVERY | ANY | On Hold - Process Definition (Subsequent Steps) |
| PROCESS | Ready | On Hold - Data Delivery Agreement (Subsequent Steps) | DELIVERY | ANY | On Hold - Data Delivery Agreement (Subsequent Steps) |
| PROCESS | In Process | Completed | DELIVERY | ANY | Completed |
| PROCESS | In Process | Error - Process Definition Level (All Steps) | DELIVERY | ANY | Error - Process Definition Level (All Steps) |
| PROCESS | In Process | Error - Data Delivery Agreement Level (All Steps) | DELIVERY | ANY | Error - Data Delivery Agreement Level (All Steps) |
| PROCESS | In Process | Error - Process Definition Level (Subsequent Steps) | DELIVERY | ANY | Error - Process Definition Level (Subsequent Steps) |

FIG. 6A

| | | | | | |
|---|---|---|---|---|---|
| PROCESS | In Process | Error - Data Delivery Agreement Level (Subsequent Steps) | DELIVERY | ANY | Error - Data Delivery Agreement Level (Subsequent Steps) |
| PROCESS | Completed | Error - Data Delivery Agreement Level (Subsequent Steps) | DELIVERY | ANY | Error - Data Delivery Agreement Level (Subsequent Steps) |
| PROCESS | Canceled | To Be Archived | DELIVERY | ANY | To Be Archived |
| PROCESS | On Hold | To Be Archived | DELIVERY | ANY | To Be Archived |
| PROCESS | On Hold | Ready | DELIVERY | ANY | Ready |
| PROCESS | On Hold | Canceled | DELIVERY | ANY | Canceled |
| PROCESS | On Hold | On Hold - Process Definition (All Steps) | DELIVERY | ANY | On Hold - Process Definition (All Steps) |
| PROCESS | On Hold | On Hold - Data Delivery Agreement (All Steps) | DELIVERY | ANY | On Hold - Data Delivery Agreement (All Steps) |
| PROCESS | On Hold | On Hold - Process Definition (Subsequent Steps) | DELIVERY | ANY | On Hold - Process Definition (Subsequent Steps) |
| PROCESS | On Hold | On Hold - Data Delivery Agreement (Subsequent Steps) | DELIVERY | ANY | On Hold - Data Delivery Agreement (Subsequent Steps) |
| PROCESS | On Hold - Process Definition (All Steps) | Ready | DELIVERY | ANY | Ready |
| PROCESS | On Hold - Process Definition (All Steps) | Completed | DELIVERY | ANY | Completed |
| PROCESS | On Hold - Process Definition (All Steps) | Canceled | DELIVERY | ANY | Canceled |

FIG. 6B

| | | | | | |
|---|---|---|---|---|---|
| PROCESS | On Hold - Process Definition (All Steps) | On Hold | DELIVERY | ANY | On Hold |
| PROCESS | On Hold - Process Definition (Subsequent Steps) | Ready | DELIVERY | ANY | Ready |
| PROCESS | On Hold - Process Definition (Subsequent Steps) | Completed | DELIVERY | ANY | Completed |
| PROCESS | On Hold - Process Definition (Subsequent Steps) | Canceled | DELIVERY | ANY | Canceled |
| PROCESS | On Hold - Process Definition (Subsequent Steps) | On Hold | DELIVERY | ANY | On Hold |
| PROCESS | On Hold - Data Delivery Agreement (Subsequent Steps) | Ready | DELIVERY | ANY | Ready |
| PROCESS | On Hold - Data Delivery Agreement (Subsequent Steps) | Completed | DELIVERY | ANY | Completed |
| PROCESS | On Hold - Data Delivery Agreement (Subsequent Steps) | Canceled | DELIVERY | ANY | Canceled |
| PROCESS | On Hold - Data Delivery Agreement (Subsequent Steps) | On Hold | DELIVERY | ANY | On Hold |
| PROCESS | Errors | Ready | DELIVERY | ANY | Ready |
| PROCESS | Errors | Canceled | DELIVERY | ANY | Canceled |

FIG. 6C

| | | | | | |
|---|---|---|---|---|---|
| PROCESS | Errors | Error - Process Definition Level (All Steps) | DELIVERY | ANY | Error - Process Definition Level (All Steps) |
| PROCESS | Errors | Error - Data Delivery Agreement Level (All Steps) | DELIVERY | ANY | Error - Data Delivery Agreement Level (All Steps) |
| PROCESS | Errors | Error - Process Definition Level (Subsequent Steps) | DELIVERY | ANY | Error - Process Definition Level (Subsequent Steps) |
| PROCESS | Errors | Error - Data Delivery Agreement Level (Subsequent Steps) | DELIVERY | ANY | Error - Data Delivery Agreement Level (Subsequent Steps) |
| PROCESS | Error - Process Definition Level (All Steps) | Ready | DELIVERY | ANY | Ready |
| PROCESS | Error - Process Definition Level (All Steps) | Completed | DELIVERY | ANY | Completed |
| PROCESS | Error - Process Definition Level (All Steps) | Canceled | DELIVERY | ANY | Canceled |
| PROCESS | Error - Process Definition Level (All Steps) | Errors | DELIVERY | ANY | Errors |
| PROCESS | Error - Data Delivery Agreement Level (All Steps) | Ready | DELIVERY | ANY | Ready |
| PROCESS | Error - Data Delivery Agreement Level (All Steps) | Completed | DELIVERY | ANY | Completed |

FIG. 6D

| | | | | | |
|---|---|---|---|---|---|
| PROCESS | Error - Data Delivery Agreement Level (All Steps) | Canceled | DELIVERY | ANY | Canceled |
| PROCESS | Error - Data Delivery Agreement Level (All Steps) | Errors | DELIVERY | ANY | Errors |
| PROCESS | Error - Process Definition Level (Subsequent Steps) | Ready | DELIVERY | ANY | Ready |
| PROCESS | Error - Process Definition Level (Subsequent Steps) | Completed | DELIVERY | ANY | Completed |
| PROCESS | Error - Process Definition Level (Subsequent Steps) | Canceled | DELIVERY | ANY | Canceled |
| PROCESS | Error - Process Definition Level (Subsequent Steps) | Errors | DELIVERY | ANY | Errors |
| PROCESS | Error - Data Delivery Agreement Level (Subsequent Steps) | Ready | DELIVERY | ANY | Ready |
| PROCESS | Error - Data Delivery Agreement Level (Subsequent Steps) | Completed | DELIVERY | ANY | Completed |
| PROCESS | Error - Data Delivery Agreement Level (Subsequent Steps) | Canceled | DELIVERY | ANY | Canceled |
| PROCESS | Error - Data Delivery Agreement Level (Subsequent Steps) | Errors | DELIVERY | ANY | Errors |

FIG. 6E

| | | | | | |
|---|---|---|---|---|---|
| PROCESS | On Hold - Process Definition (All Steps) | In Process | DELIVERY | ANY | In Process |
| PROCESS | On Hold - Data Delivery Agreement (All Steps) | In Process | DELIVERY | ANY | In Process |
| PROCESS | On Hold - Process Definition (Subsequent Steps) | In Process | DELIVERY | ANY | In Process |
| PROCESS | On Hold - Data Delivery Agreement (Subsequent Steps) | In Process | DELIVERY | ANY | In Process |
| PROCESS | Error - Process Definition Level (All Steps) | In Process | DELIVERY | ANY | In Process |
| PROCESS | Error - Data Delivery Agreement Level (All Steps) | In Process | DELIVERY | ANY | In Process |
| PROCESS | Error - Process Definition Level (Subsequent Steps) | In Process | DELIVERY | ANY | In Process |
| PROCESS | Error - Data Delivery Agreement Level (Subsequent Steps) | In Process | DELIVERY | ANY | In Process |
| PROCESS | In Process | On Hold - Process Definition (All Steps) | DELIVERY | ANY | On Hold - Process Definition (All Steps) |
| PROCESS | In Process | On Hold - Data Delivery Agreement (All Steps) | DELIVERY | ANY | On Hold - Data Delivery Agreement (All Steps) |

FIG. 6F

| | | | | | |
|---|---|---|---|---|---|
| PROCESS | In Process | On Hold - Process Definition (Subsequent Steps) | DELIVERY | ANY | On Hold - Process Definition (Subsequent Steps) |
| PROCESS | In Process | On Hold - Data Delivery Agreement (Subsequent Steps) | DELIVERY | ANY | On Hold - Data Delivery Agreement (Subsequent Steps) |
| STEP | New | Ready | DATASET | ANY | Ready |
| STEP | New | Ready | FILE | ANY | Ready |
| STEP | New | Ready | PROCESS | ALL | Ready |
| STEP | Ready | In Process | DATASET | ANY | In Process |
| STEP | Ready | In Process | FILE | ANY | In Process |
| STEP | Ready | In Process | PROCESS | ANY | In Process |
| STEP | Ready | Skipped | DATASET | ANY | Skipped |
| STEP | Ready | Skipped | FILE | ANY | Skipped |
| STEP | Ready | Skipped | PROCESS | ANY | Undefined |
| STEP | Ready | Canceled | DATASET | ANY | Canceled |
| STEP | Ready | Canceled | FILE | ANY | Canceled |
| STEP | Ready | Canceled | PROCESS | ANY | Canceled |
| STEP | Ready | On Hold - Process Definition (All Steps) | DATASET | ANY | On Hold - Process Definition (All Steps) |
| STEP | Ready | On Hold - Process Definition (All Steps) | FILE | ANY | On Hold - Process Definition (All Steps) |
| STEP | Ready | On Hold - Process Definition | PROCESS | ANY | On Hold - Process Definition |

FIG. 6G

| | | | | | |
|---|---|---|---|---|---|
| | | (All Steps) | | | (All Steps) |
| STEP | Ready | On Hold - Data Delivery Agreement (All Steps) | DATASET | ANY | On Hold - Data Delivery Agreement (All Steps) |
| STEP | Ready | On Hold - Data Delivery Agreement (All Steps) | FILE | ANY | On Hold - Data Delivery Agreement (All Steps) |
| STEP | Ready | On Hold - Data Delivery Agreement (All Steps) | PROCESS | ANY | On Hold - Data Delivery Agreement (All Steps) |
| STEP | Ready | On Hold - Process Definition (Subsequent Steps) | DATASET | ANY | On Hold - Process Definition (Subsequent Steps) |
| STEP | Ready | On Hold - Process Definition (Subsequent Steps) | FILE | ANY | On Hold - Process Definition (Subsequent Steps) |
| STEP | Ready | On Hold - Process Definition (Subsequent Steps) | PROCESS | ANY | On Hold - Process Definition (Subsequent Steps) |
| STEP | Ready | On Hold - Data Delivery Agreement (Subsequent Steps) | DATASET | ANY | On Hold - Data Delivery Agreement (Subsequent Steps) |
| STEP | Ready | On Hold - Data Delivery Agreement (Subsequent Steps) | FILE | ANY | On Hold - Data Delivery Agreement (Subsequent Steps) |
| STEP | Ready | On Hold - Data Delivery Agreement (Subsequent Steps) | PROCESS | ANY | On Hold - Data Delivery Agreement (Subsequent Steps) |
| STEP | In Process | Completed | DATASET | ANY | Completed |

FIG. 6H

| | | | | | |
|---|---|---|---|---|---|
| STEP | In Process | Completed | FILE | ANY | Completed |
| STEP | In Process | Completed | PROCESS | ALL | Completed |
| STEP | In Process | Error - Process Definition Level (All Steps) | DATASET | ANY | Error - Process Definition Level (All Steps) |
| STEP | In Process | Error - Process Definition Level (All Steps) | FILE | ANY | Error - Process Definition Level (All Steps) |
| STEP | In Process | Error - Process Definition Level (All Steps) | PROCESS | ANY | Error - Process Definition Level (All Steps) |
| STEP | In Process | Error - Data Delivery Agreement Level (All Steps) | DATASET | ANY | Error - Data Delivery Agreement Level (All Steps) |
| STEP | In Process | Error - Data Delivery Agreement Level (All Steps) | FILE | ANY | Error - Data Delivery Agreement Level (All Steps) |
| STEP | In Process | Error - Data Delivery Agreement Level (All Steps) | PROCESS | ANY | Error - Data Delivery Agreement Level (All Steps) |
| STEP | In Process | Error - Process Definition Level (Subsequent Steps) | DATASET | ANY | Error - Process Definition Level (Subsequent Steps) |
| STEP | In Process | Error - Process Definition Level (Subsequent Steps) | FILE | ANY | Error - Process Definition Level (Subsequent Steps) |
| STEP | In Process | Error - Process Definition Level | PROCESS | ANY | Error - Process Definition Level |

FIG. 6I

| | | | | | |
|---|---|---|---|---|---|
| | | (Subsequent Steps) | | | (Subsequent Steps) |
| STEP | In Process | Error - Data Delivery Agreement Level (Subsequent Steps) | DATASET | ANY | Error - Data Delivery Agreement Level (Subsequent Steps) |
| STEP | In Process | Error - Data Delivery Agreement Level (Subsequent Steps) | FILE | ANY | Error - Data Delivery Agreement Level (Subsequent Steps) |
| STEP | In Process | Error - Data Delivery Agreement Level (Subsequent Steps) | PROCESS | ANY | Error - Data Delivery Agreement Level (Subsequent Steps) |
| STEP | Skipped | To Be Archived | DATASET | ANY | To Be Archived |
| STEP | Skipped | To Be Archived | FILE | ANY | To Be Archived |
| STEP | Skipped | To Be Archived | PROCESS | ALL | To Be Archived |
| STEP | Completed | To Be Archived | DATASET | ANY | To Be Archived |
| STEP | Completed | To Be Archived | FILE | ANY | To Be Archived |
| STEP | Completed | To Be Archived | PROCESS | ALL | To Be Archived |
| STEP | Canceled | To Be Archived | DATASET | ANY | To Be Archived |
| STEP | Canceled | To Be Archived | FILE | ANY | To Be Archived |
| STEP | Canceled | To Be Archived | PROCESS | ANY | To Be Archived |
| STEP | On Hold - Process Definition (All Steps) | Ready | DATASET | ANY | Ready |
| STEP | On Hold - Process Definition (All Steps) | Ready | FILE | ANY | Ready |
| STEP | On Hold - Process | Ready | PROCESS | ANY | Undefined |

FIG. 6J

| | | | | | |
|---|---|---|---|---|---|
| | Definition (All Steps) | | | | |
| STEP | On Hold - Process Definition (All Steps) | Skipped | DATASET | ANY | Skipped |
| STEP | On Hold - Process Definition (All Steps) | Skipped | FILE | ANY | Skipped |
| STEP | On Hold - Process Definition (All Steps) | Skipped | PROCESS | ANY | Undefined |
| STEP | On Hold - Process Definition (All Steps) | Canceled | DATASET | ANY | Canceled |
| STEP | On Hold - Process Definition (All Steps) | Canceled | FILE | ANY | Canceled |
| STEP | On Hold - Process Definition (All Steps) | Canceled | PROCESS | ANY | Canceled |
| STEP | On Hold - Data Delivery Agreement (All Steps) | Ready | DATASET | ANY | Ready |
| STEP | On Hold - Data Delivery Agreement (All Steps) | Ready | FILE | ANY | Ready |
| STEP | On Hold - Data Delivery Agreement (All Steps) | Ready | PROCESS | ANY | Undefined |

FIG. 6K

| | | | | | |
|---|---|---|---|---|---|
| STEP | On Hold - Data Delivery Agreement (All Steps) | Skipped | DATASET | ANY | Skipped |
| STEP | On Hold - Data Delivery Agreement (All Steps) | Skipped | FILE | ANY | Skipped |
| STEP | On Hold - Data Delivery Agreement (All Steps) | Skipped | PROCESS | ANY | Undefined |
| STEP | On Hold - Data Delivery Agreement (All Steps) | Canceled | DATASET | ANY | Canceled |
| STEP | On Hold - Data Delivery Agreement (All Steps) | Canceled | FILE | ANY | Canceled |
| STEP | On Hold - Data Delivery Agreement (All Steps) | Canceled | PROCESS | ANY | Canceled |
| STEP | On Hold - Process Definition (Subsequent Steps) | Ready | DATASET | ANY | Ready |
| STEP | On Hold - Process Definition (Subsequent Steps) | Ready | FILE | ANY | Ready |
| STEP | On Hold - Process Definition (Subsequent Steps) | Ready | PROCESS | ANY | Undefined |
| STEP | On Hold - Process Definition | Skipped | DATASET | ANY | Skipped |

FIG. 6L

| | | | | | |
|---|---|---|---|---|---|
| | (Subsequent Steps) | | | | |
| STEP | On Hold - Process Definition (Subsequent Steps) | Skipped | FILE | ANY | Skipped |
| STEP | On Hold - Process Definition (Subsequent Steps) | Skipped | PROCESS | ANY | Undefined |
| STEP | On Hold - Process Definition (Subsequent Steps) | Canceled | DATASET | ANY | Canceled |
| STEP | On Hold - Process Definition (Subsequent Steps) | Canceled | FILE | ANY | Canceled |
| STEP | On Hold - Process Definition (Subsequent Steps) | Canceled | PROCESS | ANY | Canceled |
| STEP | On Hold - Data Delivery Agreement (Subsequent Steps) | Ready | DATASET | ANY | Ready |
| STEP | On Hold - Data Delivery Agreement (Subsequent Steps) | Ready | FILE | ANY | Ready |
| STEP | On Hold - Data Delivery Agreement (Subsequent Steps) | Ready | PROCESS | ANY | Undefined |
| STEP | On Hold - Data Delivery Agreement (Subsequent Steps) | Skipped | DATASET | ANY | Skipped |
| STEP | On Hold - Data | Skipped | FILE | ANY | Skipped |

FIG. 6M

| | | | | | |
|---|---|---|---|---|---|
| | Delivery Agreement (Subsequent Steps) | | | | |
| STEP | On Hold - Data Delivery Agreement (Subsequent Steps) | Skipped | PROCESS | ANY | Undefined |
| STEP | On Hold - Data Delivery Agreement (Subsequent Steps) | Canceled | DATASET | ANY | Canceled |
| STEP | On Hold - Data Delivery Agreement (Subsequent Steps) | Canceled | FILE | ANY | Canceled |
| STEP | On Hold - Data Delivery Agreement (Subsequent Steps) | Canceled | PROCESS | ANY | Canceled |
| STEP | Error - Process Definition Level (All Steps) | Ready | DATASET | ANY | Ready |
| STEP | Error - Process Definition Level (All Steps) | Ready | FILE | ANY | Ready |
| STEP | Error - Process Definition Level (All Steps) | Ready | PROCESS | ANY | Undefined |
| STEP | Error - Process Definition Level (All Steps) | Skipped | DATASET | ANY | Skipped |
| STEP | Error - Process Definition Level (All Steps) | Skipped | FILE | ANY | Skipped |

FIG. 6N

| | | | | | |
|---|---|---|---|---|---|
| STEP | Error - Process Definition Level (All Steps) | Skipped | PROCESS | ANY | Undefined |
| STEP | Error - Process Definition Level (All Steps) | Canceled | DATASET | ANY | Canceled |
| STEP | Error - Process Definition Level (All Steps) | Canceled | FILE | ANY | Canceled |
| STEP | Error - Process Definition Level (All Steps) | Canceled | PROCESS | ANY | Canceled |
| STEP | Error - Data Delivery Agreement Level (All Steps) | Ready | DATASET | ANY | Ready |
| STEP | Error - Data Delivery Agreement Level (All Steps) | Ready | FILE | ANY | Ready |
| STEP | Error - Data Delivery Agreement Level (All Steps) | Ready | PROCESS | ANY | Undefined |
| STEP | Error - Data Delivery Agreement Level (All Steps) | Skipped | DATASET | ANY | Skipped |
| STEP | Error - Data Delivery Agreement Level (All Steps) | Skipped | FILE | ANY | Skipped |
| STEP | Error - Data Delivery Agreement Level | Skipped | PROCESS | ANY | Undefined |

FIG. 6O

| | | | | | |
|---|---|---|---|---|---|
| | (All Steps) | | | | |
| STEP | Error - Data Delivery Agreement Level (All Steps) | Canceled | DATASET | ANY | Canceled |
| STEP | Error - Data Delivery Agreement Level (All Steps) | Canceled | FILE | ANY | Canceled |
| STEP | Error - Data Delivery Agreement Level (All Steps) | Canceled | PROCESS | ANY | Canceled |
| STEP | Error - Process Definition Level (Subsequent Steps) | Ready | DATASET | ANY | Ready |
| STEP | Error - Process Definition Level (Subsequent Steps) | Ready | FILE | ANY | Ready |
| STEP | Error - Process Definition Level (Subsequent Steps) | Ready | PROCESS | ANY | Undefined |
| STEP | Error - Process Definition Level (Subsequent Steps) | Skipped | DATASET | ANY | Skipped |
| STEP | Error - Process Definition Level (Subsequent Steps) | Skipped | FILE | ANY | Skipped |
| STEP | Error - Process Definition Level (Subsequent Steps) | Skipped | PROCESS | ANY | Undefined |
| STEP | Error - Process | Canceled | DATASET | ANY | Canceled |

FIG. 6P

| | | | | | |
|---|---|---|---|---|---|
| | Definition Level (Subsequent Steps) | | | | |
| STEP | Error - Process Definition Level (Subsequent Steps) | Canceled | FILE | ANY | Canceled |
| STEP | Error - Process Definition Level (Subsequent Steps) | Canceled | PROCESS | ANY | Canceled |
| STEP | Error - Data Delivery Agreement Level (Subsequent Steps) | Ready | DATASET | ANY | Ready |
| STEP | Error - Data Delivery Agreement Level (Subsequent Steps) | Ready | FILE | ANY | Ready |
| STEP | Error - Data Delivery Agreement Level (Subsequent Steps) | Ready | PROCESS | ANY | Undefined |
| STEP | Error - Data Delivery Agreement Level (Subsequent Steps) | Skipped | DATASET | ANY | Skipped |
| STEP | Error - Data Delivery Agreement Level (Subsequent Steps) | Skipped | FILE | ANY | Skipped |
| STEP | Error - Data Delivery Agreement Level (Subsequent Steps) | Skipped | PROCESS | ANY | Undefined |
| STEP | Error - Data Delivery Agreement Level (Subsequent Steps) | Canceled | DATASET | ANY | Canceled |
| STEP | Error - Data Delivery | Canceled | FILE | ANY | Canceled |

FIG. 6Q

| | | | | | |
|---|---|---|---|---|---|
| | Agreement Level (Subsequent Steps) | | | | |
| STEP | Error - Data Delivery Agreement Level (Subsequent Steps) | Canceled | PROCESS | ANY | Canceled |
| STEP | Error - Process Definition Level (All Steps) | Completed | DATASET | ANY | Completed |
| STEP | Error - Process Definition Level (All Steps) | Completed | FILE | ANY | Completed |
| STEP | Error - Process Definition Level (All Steps) | Completed | PROCESS | ANY | Undefined |
| STEP | Error - Data Delivery Agreement Level (All Steps) | Completed | DATASET | ANY | Completed |
| STEP | Error - Data Delivery Agreement Level (All Steps) | Completed | FILE | ANY | Completed |
| STEP | Error - Data Delivery Agreement Level (All Steps) | Completed | PROCESS | ANY | Undefined |
| STEP | Error - Process Definition Level (Subsequent Steps) | Completed | DATASET | ANY | Completed |
| STEP | Error - Process Definition Level (Subsequent Steps) | Completed | FILE | ANY | Completed |

FIG. 6R

| | | | | | |
|---|---|---|---|---|---|
| STEP | Error - Process Definition Level (Subsequent Steps) | Completed | PROCESS | ANY | Undefined |
| STEP | Error - Data Delivery Agreement Level (Subsequent Steps) | Completed | DATASET | ANY | Completed |
| STEP | Error - Data Delivery Agreement Level (Subsequent Steps) | Completed | FILE | ANY | Completed |
| STEP | Error - Data Delivery Agreement Level (Subsequent Steps) | Completed | PROCESS | ANY | Undefined |
| STEP | Manual | Completed | DATASET | ANY | Completed |
| STEP | Manual | Completed | PROCESS | ALL | Completed |
| STEP | Manual | Error - Process Definition Level (All Steps) | DATASET | ANY | Error - Process Definition Level (All Steps) |
| STEP | Manual | Error - Process Definition Level (All Steps) | PROCESS | ANY | Error - Process Definition Level (All Steps) |

FIG. 6S

| | | | | | |
|---|---|---|---|---|---|
| STEP | Manual | Error - Data Delivery Agreement Level (All Steps) | DATASET | ANY | Error - Data Delivery Agreement Level (All Steps) |
| STEP | Manual | Error - Data Delivery Agreement Level (All Steps) | PROCESS | ANY | Error - Data Delivery Agreement Level (All Steps) |
| STEP | Manual | Error - Process Definition Level (Subsequent Steps) | DATASET | ANY | Error - Process Definition Level (Subsequent Steps) |
| STEP | Manual | Error - Process Definition Level (Subsequent Steps) | PROCESS | ANY | Error - Process Definition Level (Subsequent Steps) |
| STEP | Manual | Error - Data Delivery Agreement Level (Subsequent Steps) | DATASET | ANY | Error - Data Delivery Agreement Level (Subsequent Steps) |
| STEP | Manual | Error - Data Delivery Agreement Level (Subsequent Steps) | PROCESS | ANY | Error - Data Delivery Agreement Level (Subsequent Steps) |

FIG. 6T

GENERIC LIFECYCLE MANAGEMENT OF ENTITY IN HIERARCHY ACCORDING TO STATUS

BACKGROUND

Embodiments of the present invention relate to entity management, and in particular, to methods and systems for generic lifecycle management of hierarchical entities by status.

Unless otherwise indicated herein, the approaches described in this section are not prior art to the claims in this application and are not admitted to be prior art by inclusion in this section.

Entities may evolve over a lifetime. For example, an entity may be constructed in various stages, be deployed to function sequentially in different environments, and may decline in stages and ultimately expire. An example of such a lifetime is one of an automobile, which may be built in stages, leased, sold, resold, and eventually scrapped and individual parts reused for replacing those of other vehicles.

Frequently, there is a need to react on states of such entities in a different way over the course of their lifecycle. For example, an automobile manufacturer may seek to track information regarding an automobile in different ways over different stages of its lifetime. Thus owing to considerations such as warranty, a manufacturer may seek to track contact information for an original vehicle owner in a different manner than a downstream, subsequent owner. Such management approaches may exhibit consistency and uniformity over entity lifetime, while being flexible enough to accommodate variations in lifecycle between different entities.

Accordingly, the present disclosure addresses these and other issues with methods and systems for generic lifecycle management of entities according to their statuses.

SUMMARY

Lifecycle of an entity residing within a hierarchy, may be managed according to corresponding status identifiers of a ruleset referenced by an engine. At design time, particular embodiments determine a finite set of fundamental statuses common to the entities, and covering the full lifecycle of each entity. A ruleset is created comprising rules accounting for each change in the status of the entity over its lifetime within the hierarchy. The status may be indicated by status identifiers, that in some embodiments are stored within a database. During runtime, an engine receives information from the entity. The engine references the ruleset including the status identifier information, and then propagates the status change of the entity to other entities in the same or different hierarchy levels based upon the ruleset. In this manner, the lifecycle of an entity within a hierarchy can be managed according to its status.

An embodiment of a computer-implemented method comprises causing an engine to receive from a first entity belonging to a hierarchy, information regarding a lifecycle change of the first entity from a first status to a second status. In response to the information, the engine is caused to reference a rule of a predefined ruleset, the rule comprising a status identifier. Based upon the rule, the engine is caused to propagate the second status to change a status of a second entity belonging to the hierarchy.

An embodiment of a non-transitory computer readable storage medium embodies a computer program for performing a method comprising causing an engine to receive from a first entity belonging to a hierarchy, information regarding a lifecycle change of the first entity from a first status to a second status. In response to the information, the engine is caused to reference a rule of a predefined ruleset, the rule comprising a status identifier. Based upon the rule, the engine is caused to propagate the second status to change a status of a second entity belonging to the hierarchy.

An embodiment of a computer system comprises one or more processors and a software program executable on said computer system. The software program is configured to cause an engine to receive from a first entity belonging to a hierarchy, information regarding a lifecycle change of the first entity from a first status to a second status. In response to the information, the software program is configured to cause the engine to reference a rule of a predefined ruleset, the rule comprising a status identifier. Based upon the rule, the software program is configured cause the engine to propagate the second status to change a status of a second entity belonging to the hierarchy.

In some embodiments the first entity belongs to a lower level in the hierarchy than the second entity, and the rule calls for propagating the second status as soon as the information is received.

In certain embodiment the first entity belongs to a lower level in the hierarchy than the second entity, and the rule calls for propagating the second status only after other entities belonging to the lower level are changed to a specific state.

In various embodiments the ruleset is stored as a table comprising rows and columns, and a first row represents the rule, and a second row represents a second rule propagating the second status to a third entity belonging to a same hierarchy level as the first entity.

In particular embodiments the ruleset is stored as a table comprising rows and columns, and a first row represents the rule, and a second row represents a second rule propagating the second status to a third entity belonging to a different hierarchy level than the first entity.

According to certain embodiments the ruleset is stored as a table comprising rows and columns, and a column comprises the status identifier.

In some embodiments the second entity comprises a process, and the first entity comprises a step of the process.

The following detailed description and accompanying drawings provide a better understanding of the nature and advantages of particular embodiments.

BRIEF DESCRIPTION OF THE DRAWINGS

FIGS. 6A-6T show a sample ruleset referenced for lifecycle management of entities within a process flow control hierarchy.

DETAILED DESCRIPTION

Figure 1:
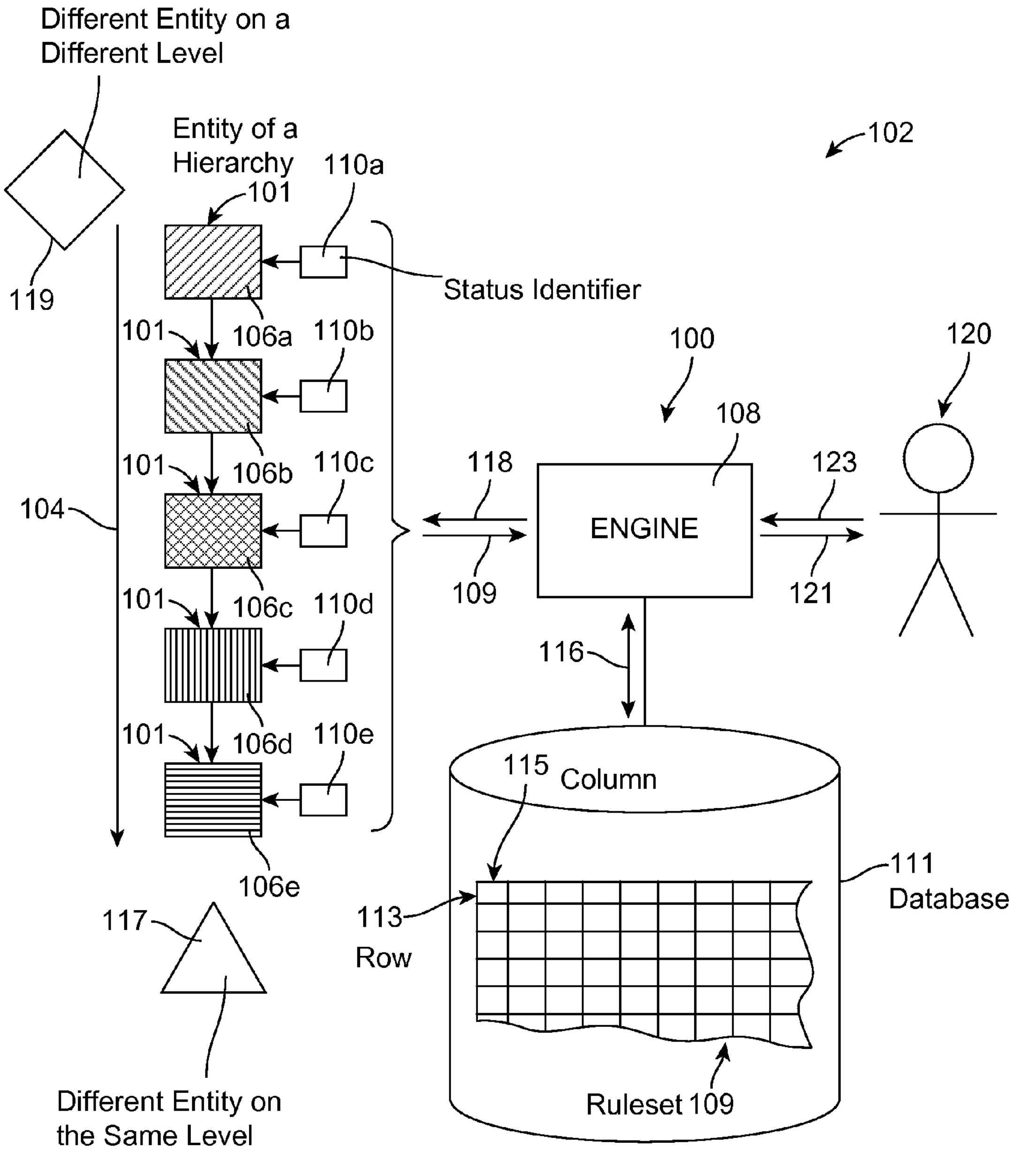
FIG. 1 shows a simplified schematic view of an embodiment of a lifecycle management system according to an embodiment.

Described herein are techniques for management of the lifecycle of an entity. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Entity lifecycle management according to embodiments, may be based upon one or more principles. One principle is that where a hierarchy of entities is to be managed as a whole, it is possible to determine a fundamental and finite set of statuses common to the hierarchy levels and covering the lifecycle of each entity within the hierarchy.

A second principle is that in hierarchical structures, the status of a higher level node is determined solely based on the statuses of nodes of lower levels. Thus, it shall be possible to identify set of rules for each status change, where such rules are different for different #source# and #target# statuses, hierarchy levels, etc.

Accordingly, embodiments may employ an approach comprising three parts. A first part is to define a ruleset in design time, where the rules may be of multiple types and complexities.

A second part is to identify during runtime, a rule to be applied in a specific case due to a status changed caused by action performed with entity. In a basic case, status change for the entity is communicated by the same agent that performs an action.

A third part is the application of the rule or rules based upon the definition. A fourth part may comprise informing a user/agent concerning a status change, and allowing the user/agent to execute some real-world action (and allow a change in status again).

In many cases, propagation of changes in entity status can be captured by defining simple rules. One example of a relatively simple rule is:

#apply change to higher level as soon as any change is done at lower level#.

This simple rule is expressed as "ANY", in the "Condition" column of the example ruleset of FIG. 6 described in the Example below.

Another example of a relatively simple rule is:

#apply changes only when all objects of lower level are changed to specific state.

This simple rule is expressed as "ALL", in the "Condition" column of the example ruleset of FIG. 6 described in the Example below.

On occasion, more complex rules for specific conditions may be needed. These situations can be identified in advance and are relatively rare, and so an overall enhancement in efficiency of lifecycle management can be achieved utilizing an engine referencing a ruleset according to various embodiments.

FIG. 1 shows a simplified schematic view of a lifecycle management system 100 in an embodiment. In particular, an entity 101 of hierarchy level residing within a hierarchy 102, is expected to undergo various stages 106*a-e* over the course of its lifecycle 104.

At a time of designing the lifecycle management system, a finite set of fundamental status identifiers 110*a-e* common to all the entities within hierarchy 102, and covering the full lifecycle of each entity, is determined. Based upon these status identifiers, a ruleset 109 is created that comprises rules defined for each change of status identifier in the above mentioned set 110*a-e*.

This ruleset may be stored in a database 111. As an example, the ruleset may comprise rows 113 and columns 115.

The rows may correspond to a particular rule for a particular level within a hierarchy whose lifecycle is being managed, with entities within the hierarchy level behaving in a similar fashion. Other rows may represent additional rules for the same or different level within the hierarchy.

The various columns may correspond to pieces of information relevant to each rule. One of those pieces of information may be the new status identifier. Examples of other pieces of information may include but are not limited to, a source of the change, a different hierarchy level, or an old status identifier, etc.

While FIG. 1 depicts the ruleset as a table comprising rows and columns for the purposes of illustration, this is not required. In various embodiments the ruleset could be present in other forms.

During runtime, an engine 108 of the lifecycle status management system is in communication with the entity to receive information 109 as it undergoes its lifecycle. In response to this information received from the entity, the engine is configured to reference 116 the ruleset and the status identifier information contained therein, and then to propagate 118 the status change communicated by the entity to a different entity 117 of the same hierarch level and/or a different entity 119 of a different hierarchy level, based on the ruleset.

The ruleset correlates entity status with actions to be taken in order to manage the entity over the course of its lifetime. A user 120 may access the engine to monitor 121 and/or change 123 entity status, and take action appropriate thereto.

Figure 2:
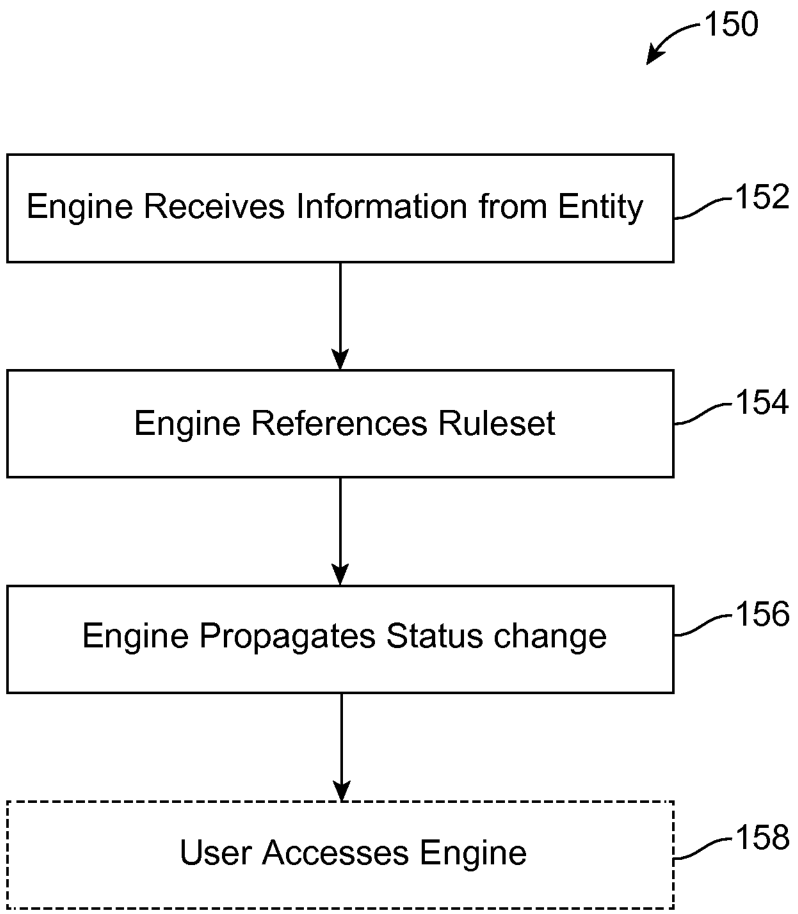
FIG. 2 is a simplified flow diagram showing a method 150 according to an embodiment.

FIG. 2 is a simplified flow diagram showing a method 150 according to an embodiment. In a first step 152, an engine is caused to receive from a first entity belonging to a hierarchy, information regarding a lifecycle change of the first entity from a first status to a second status. In a second step 154, in response to the information the engine is caused to reference a rule of a predefined ruleset, the rule comprising a status identifier. In a third step 156, based upon the rule the engine is caused to propagate the second status to change a status of a second entity belonging to the hierarchy. In an optional fourth step 158 a user accesses the engine to monitor and/or change entity status, and take action appropriate thereto.

Example

One specific example is now provided in connection with management of the lifetime of the following hierarchy of entities, which are employed for the purpose of a process flow control (PFC) scheme:

Delivery, comprising 1 to N processes;

Process, comprising 1 to N steps; and

Step, that may or may not have association with a File or Dataset. The File and Dataset comprise entities lying outside of the hierarchy and having a same lifecycle as a corresponding Step.

Figure 3:
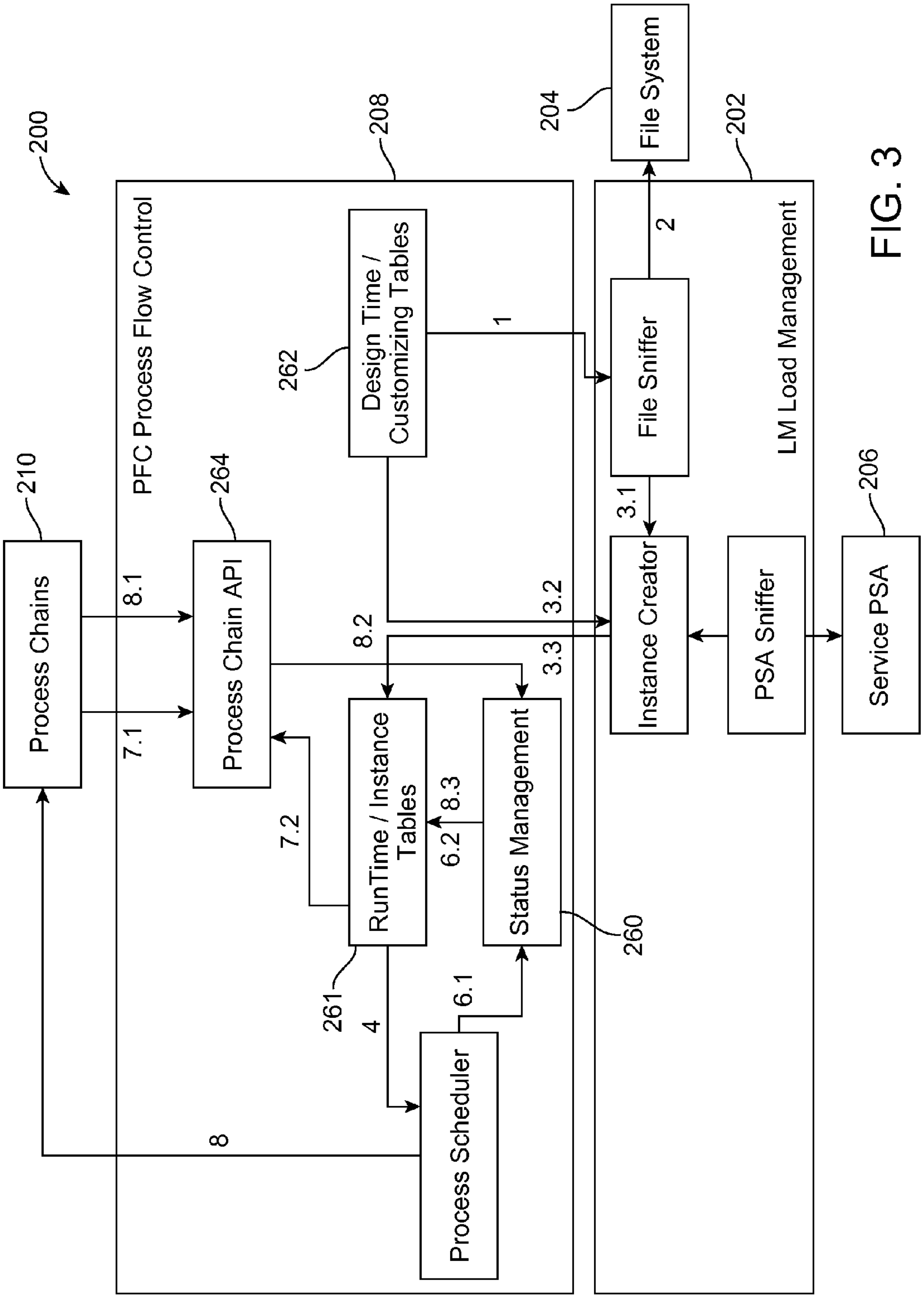
FIG. 3 shows a simplified view of an embodiment of a process flow control architecture.

FIG. 3 shows a simplified view of a Demand Signal Management (DSiM) architecture employed by SAP of Walldorf, Germany. In particular, the DSiM architecture 200 comprises a Load Management (LM) module 202 that is configured to receive information from a file system 204 and a service Persistent Staging Area (PSA) 206.

The load management module selectively forwards the received information to a Process Flow Control (PFC) module 208. The PFC module 208 in turn delivers the information to a process chain 210 in a desired manner (e.g. priority, order) for processing.

Figure 4:
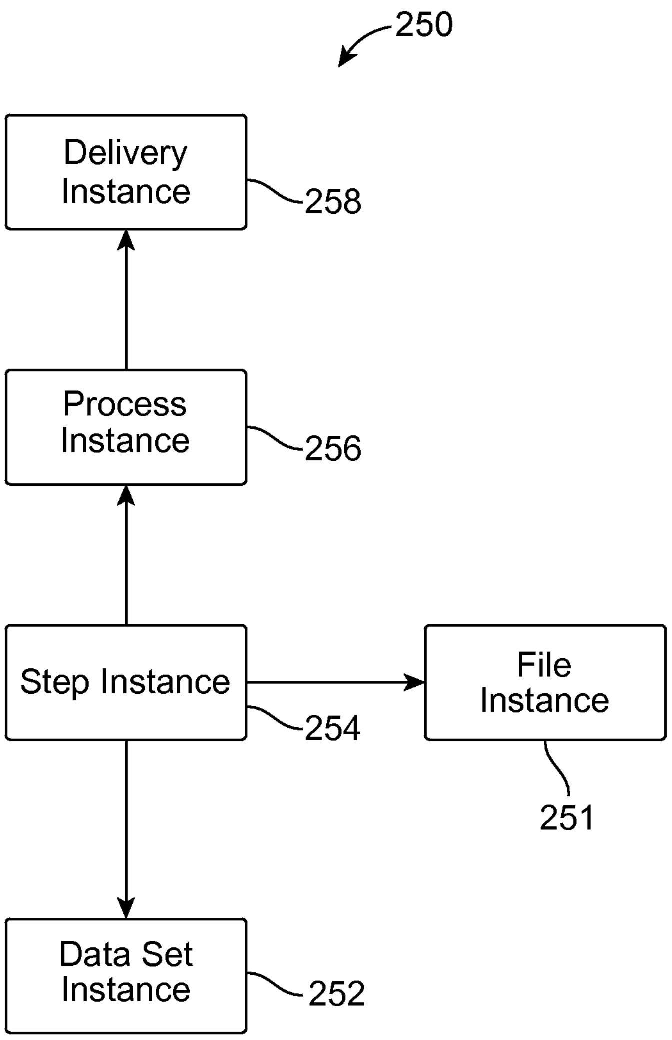
FIG. 4 shows a simplified view of the entities related to the architecture of FIG. 3.

The flow of information through the DSiM architecture 200 may be summarized in FIG. 4, with Step Instance, Process Instance and Delivery Instance forming a hierarchy 250. The arrows in FIG. 4 depict direction of propagation of statuses according to the ruleset.

In particular FIG. 4 shows that information from a file (managed by instance 251), and/or from a data set (managed by instance 252), is transferred (by a Process Chain associated to the step instance 254 in the LM module) to a SAP NetWeaver™ Business Warehouse (BW) object. Here, that object is in a PSA.

After each action step, instance status is updated in the PFC module. That updated status is propagated to the process instance 256 and delivery instance 258 to allow further actions/processing.

The Demand Signal Management includes many processes which in turn include many possible steps. These steps can be executed depending on the statuses of the previous step\steps.

To allow the steps to be executed in the correct order under the right conditions, a flexible framework was created. This lifecycle management framework helps manage the statuses of each step, and aids in triggering the appropriate events to continue/abort the processing as desired.

In particular, the process flow control module of FIG. 3 includes a status management propagation engine 260. Whenever there is an instance status change, the status management propagation engine shall update the status in an instance table 261 for a particular instance. In an embodiment, this is achieved by providing an application program interface (API) 264 for process chains (PCs) to call status management to update status by the end of execution of the process chain.

Based on the propagation rules, the engine may propagate this status change to relevant instances. These propagation rules are stored in the system via a table 262. The FIG. 4 shows the flow of status propagation among different instances.

In this particular embodiment, status management according to this element may provide the following functionalities. The status management element may provide an Instance Status for use by instances such as File, Dataset, Process, Step, and Delivery.

The status management element may propagate statuses based on propagation rules. These rules may be present in the Design Time/Customizing Tables 262.

Functionalities like Quality Validation, Load Manager, and File Sniffer of the SAP DSiM architecture shall utilize the status management to establish and obtain statuses. In particular, status management is a part of the Process Flow Controller.

Status Management shall set the statuses for instance tables, and propagate this information to active listeners based on propagation rules defined in the system. Based on current status in the RunTime/Instance Table 261, the process flow controller module shall determine the next possible step for execution.

One building block of the DSiM architecture is the instance status. These are common statuses which shall be used by instances like file, data set, delivery, step and process. This status information shall be present in instance tables.

The PFC will use this status information to decide the next possible executable step in the process. Statuses will be stored in the corresponding instance tables.

Figure 5:
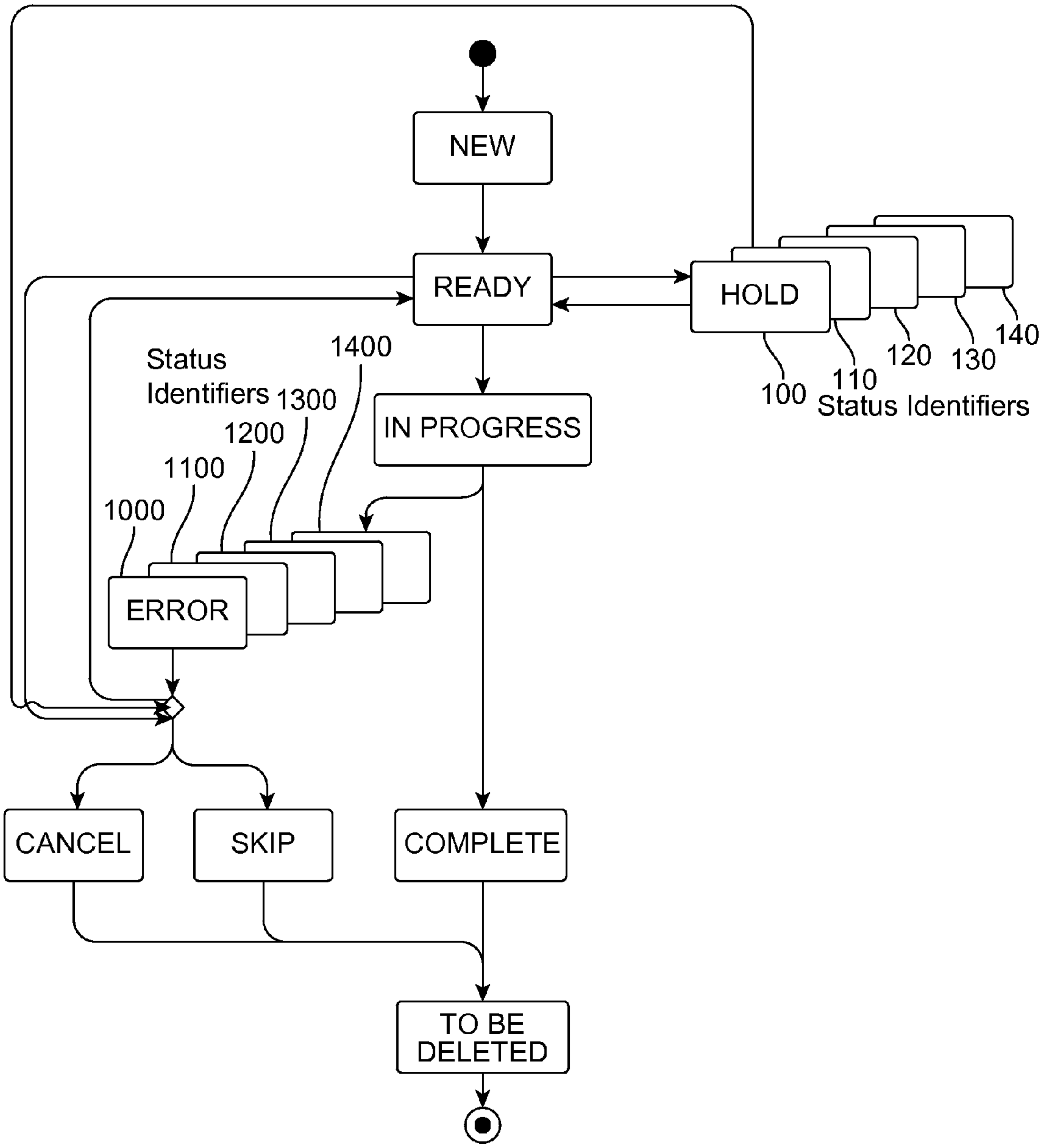
FIG. 5 shows a flow diagram of the possible statuses of any entity within the system of FIG. 3.

FIG. 5 is a simplified flow diagram showing the possible instance statuses provided by the status management system, and their sequence of occurrence. In particular, status change is possible only in the direction of arrows in FIG. 5. Thus in this particular embodiment status can change from "New", only to "Ready". A change in status from "New" to "In Process" is not allowed.

The following table provides more detail regarding the specific status identifiers shown in FIG. 5.

| Status Id | Text | Description |
|---|---|---|
| 0000 | Undefined | Undefined |
| 0010 | New | Whenever record gets created in instance table, its first status should be New, e.g. File has arrived in the system or Step has been created in instance table |
| 0020 | Ready | When the data is complete and ready for processing: e.g., Step satisfies all required conditions and ready for execution. |
| 0030 | In Process | Data execution is currently in process. |
| 0050 | Skip | Skip the current execution. For example, if Step runs into Error and Administrator decides to continue with remaining steps, then he can set this error step in Skip status so that remaining steps and process can continue running. This status can be set manually. |
| 0070 | Complete | Data execution is completed. |
| 0080 | Cancel | Data execution is cancelled. |
| 0090 | To be deleted | To be deleted. |
| 0100 | Hold | This status is used internally by status management during propagation when there are more than one HOLD statuses set for different steps of the same Process. For example, a Process WALCAN has three steps, and for step 1 status is set as 'Data Delivery Agreement - Hold All' and for step 2 status is set as 'Process Definition - Hold From'. In this case, status management will set status as 'HOLD' for corresponding Process and Delivery via status management propagation. |
| 0110 | Process Definition-Hold All | This status is set manually by Administrator to hold the processes at Process Definition level. |

-continued

| Status Id | Text | Description |
|---|---|---|
| 0120 | Data Delivery Agreement-Hold All | This status is set manually by Administrator to hold the processes at Data Agreement level. |
| 0130 | Process Definition-Hold From | This status is set manually by Administrator to hold the processes up to the step at Process Definition level. For example, a process definition 'ABC' has 2 processes and each process has 3 steps. If for process 1, 'Process Definition - Hold From' status is set at Step 2, then PFC will execute Process 2 up to step 1 since this status is applicable at process definition level. |
| 0140 | Data Delivery Agreement-Hold From | This status is set manually by Administrator to hold the processes up to the step at Data Agreement level. This is similar to the example provided for status '0130'. |
| 01000 | Errors | This status is used internally by status management during propagation when there are more than one error statuses set for different steps of the same Process. For example, a process WALCAN has three steps and for step 1 status is set as 'Data Delivery Agreement - Error All', and for step 2 status is set as 'Process Definition - Error From'. In this case, status management will set status as 'Errors' for corresponding Process and Delivery via status management propagation. |
| 01100 | Process Definition-Error All | Error at process definition level and stop execution of all processes that corresponds to that particular process definition. |
| 01200 | Data Delivery Agreement-Error All | Error at data agreement level and stop execution of all processes corresponds to that particular data agreement. |
| 01300 | Process Definition-Error From | Error at process definition level but execution of other processes is allowed up to error step. For example, a process definition 'ABC' has 2 processes and each process has 3 steps. If for process 1, 'Process Definition - Error From' status is set at Step 2 then PFC will execute Process 2 up to step 1 since this status is applicable at process definition level. |
| 01400 | Data Delivery Agreement-Error From | Error at data agreement level but execution of other processes is allowed up to error step. For example, this is similar to example provided for status 1300. |

FIGS. 6A-6T set forth in tabular form, the rules of a ruleset that may be used by Status Management Propagation. Here, 'To be deleted' is a final status.

For the condition 'ANY', when any single step moves from status 'New' to 'Ready', then the corresponding File or Dataset status should be adjusted to 'Ready'. For the condition 'ALL', when all the steps of a particular process are completed and set to status 'Complete', only then the process itself gets a status 'Complete'.

Also in the sample ruleset of FIGS. 6A-6T, there are cases where Files and Datasets are not associated with steps. In such scenarios status propagation will be handled programmatically and appropriate status will be set for File and Data Set instances.

For example, the .FIN file is not associated with any step. It is one example where "Undefined" status could be used to handle an event with specific programming If there are multiple error statuses or hold statuses at the step level, then the generic status identifiers Errors (1000) or Hold (0100) may be propagated to the corresponding Process and Delivery Instance. Basically, in this embodiment when there is more than one error for different steps of the same process, then status management propagation will propagate generic error status Errors (1000).

For example, a Process ABC has three steps which can be executed in parallel, and step 1 runs into error with status 'Process Definition—Error All' and step 2 runs into error with status 'Data Delivery Agreement—Error From'. In this situation, the status management propagation engine will propagate the status 'Errors (1000)' to Process and Deliver instance.

In another example, a Process ABC has three steps which can be executed in parallel, and step 1 runs into error with status 'Data Delivery Agreement—Error From' and step 2 runs into error with status 'Data Delivery Agreement—Error From'. In this situation, the status management propagation engine will propagate the status 'Errors (1000)' to Process and Deliver instance.

In this embodiment, generic status is provided for multiple errors or hold statuses. This may be beneficial insofar as for error resolution, most of the time you have to look at step statuses. So even if it is decided which status has higher priority and propagate this to Process or Delivery Instance, it will not be of much help and might lead to confusion for the Administrator.

Moreover, it is not always possible to decide accurately which error status has highest priority. And in such cases, propagation might lead to confusion for end user.

For example a Process ABC may have three steps which can be executed in parallel, and step 1 runs into error with status 'Data Delivery Agreement—Error All' and step 2 runs into error with status 'Process Def Upto'. In such a scenario, there is no clear way to determine highest priority.

Still another basis for providing generic status for multiple errors or hold statuses in this embodiment, is that the occurrence of this type of complex error scenarios are not frequent, and calling application is in better position to handle these error scenarios.

While in general it is possible to create propagation rules for all combinations of errors and holds, the job of status management is to log status changes and propagate this change accurately to all stake holders. For extensibility purposes it may not be desirable to include some decision making propagation rules in this functionality, forbidding calling application from making additional decisions based on actual runtime statuses. The same rationale may apply in the case of propagation of Hold statuses.

The following example describes how status changes take place at runtime.

1. At runtime, the Load Manager shall create Delivery, File and Data Set Instances in respective Instance Tables with Status=New.
2. After successful completion of 1, the load manger shall create Process and Step Instances in respective Instance Tables with Status=New.
3. The Load Manager shall update Delivery, File and Data Set Instances in respective Instance Tables with Process_Id information.
4. The Load Manager shall set Status=Ready for Steps. This action shall trigger the status propagation, and relevant status changes shall take place (e.g. status changes for File instance, Data set Instance etc.)
5. The Process Flow Controller shall pick up the first available (in status "Ready") Step for processing and update corresponding status.

Lifecycle management of entity by status according to various embodiments, may offer certain benefits. For example, some embodiments may offer an integrated approach that is able to handle hierarchies, and significantly minimize development/implementation efforts.

Moreover, providing simple, configurable rules for a majority of cases within a ruleset, may significantly reduce development time by avoiding having to specifically program for each case. This in turn can lower the true cost of ownership (TCO) for the corresponding solution.

Figure 7:
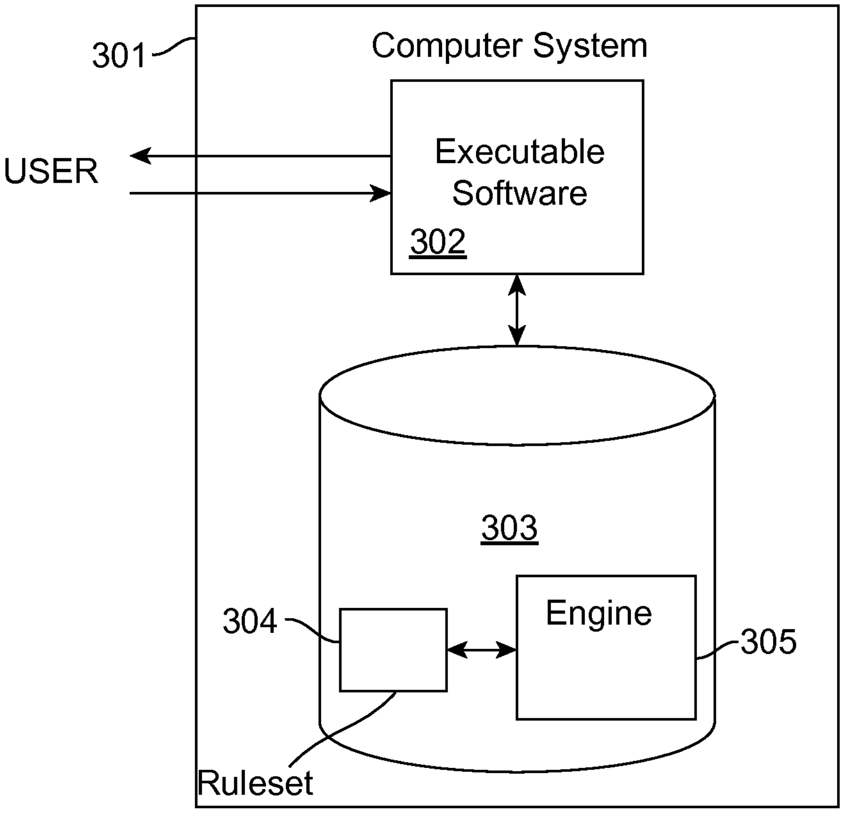
FIG. 7 illustrates hardware of a special purpose computing machine configured to perform lifecycle management according to an embodiment.

FIG. 7 illustrates hardware of a special purpose computing machine configured to perform entity lifecycle management according to an embodiment. In particular, computer system 300 comprises a processor 302 that is in electronic communication with a non-transitory computer-readable storage medium 303. This computer-readable storage medium has stored thereon code 305 corresponding to an engine. Code 304 corresponds to a ruleset referenced by the engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 8:
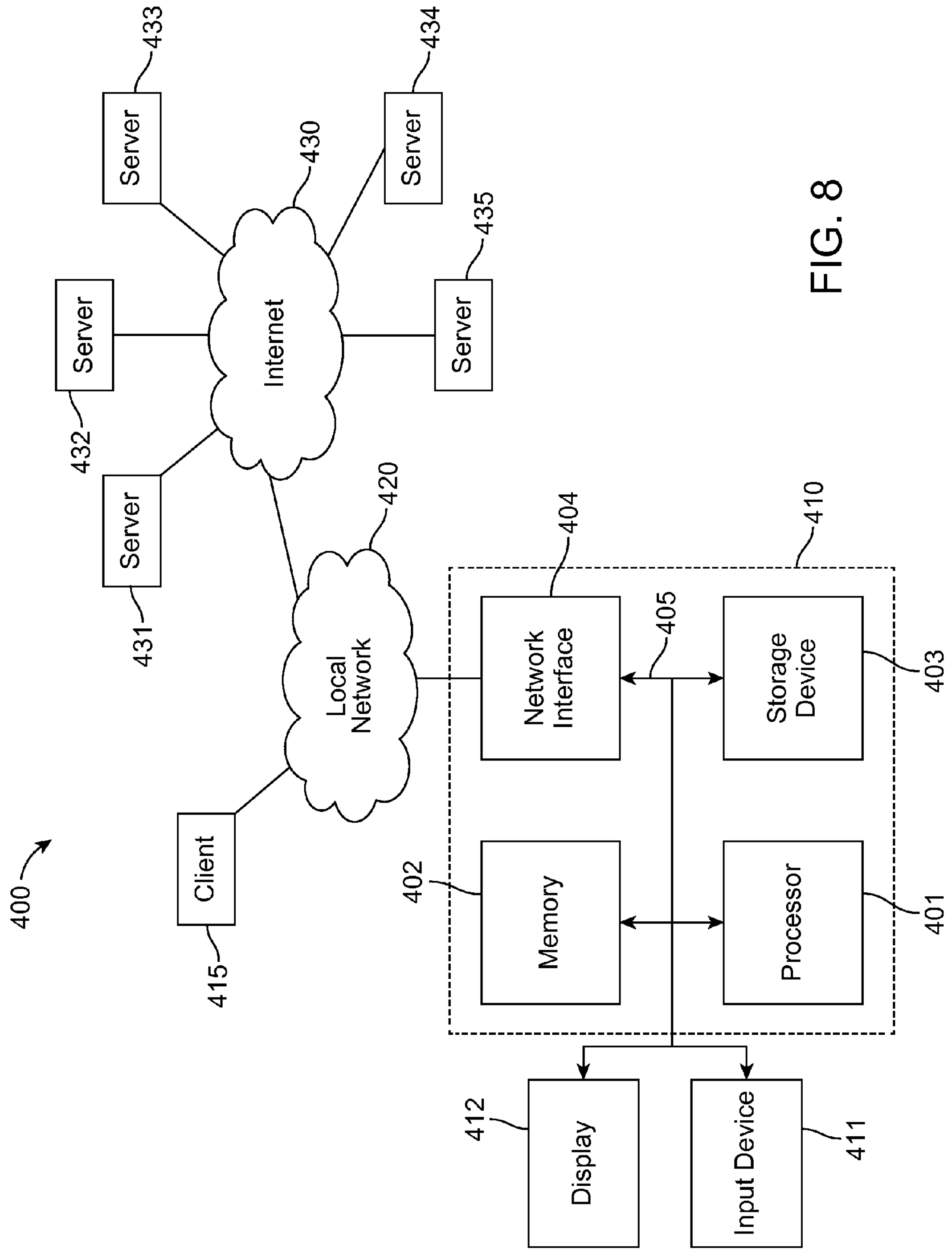
FIG. 8 illustrates an example of a computer system.

An example computer system 410 is illustrated in FIG. 8. Computer system 410 includes a bus 405 or other communication mechanism for communicating information, and a processor 401 coupled with bus 405 for processing information. Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable mediums.

Computer system 410 may be coupled via bus 405 to a display 412, such as a cathode ray tube (CRT) or liquid crystal display (LCD), for displaying information to a computer user. An input device 411 such as a keyboard and/or mouse is coupled to bus 605 for communicating information and command selections from the user to processor 401. The combination of these components allows the user to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 404 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein. In the Internet example, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:

causing an engine to receive from a first entity belonging to a hierarchy, information regarding a lifecycle change of the first entity from a first status to a second status associated with an event, wherein the first entity comprises a step of a process;

in response to the information, causing the engine to reference a rule of a predefined ruleset stored in a hardware server as a database table comprising rows and columns, the rule comprising a row and a status identifier comprising a first column; and based upon the rule, causing the engine to propagate the second status to change a status of a second entity belonging to the hierarchy, wherein the second entity comprises the process and wherein:

a second column of the table comprises a new status identifier used to handle the event with specific programming comprising propagating a generic error status identifier to indicate an error for the step and another error for a different step of the process.

2. A method as in claim 1 wherein:

the first entity belongs to a lower level in the hierarchy than the second entity; and the rule calls for propagating the second status as soon as the information is received.

3. A method as in claim 1 wherein:

the first entity belongs to a lower level in the hierarchy than the second entity; and the rule calls for propagating the second status only after other entities belonging to the lower level are changed to a specific state.

4. A method as in claim 1 wherein:

the step and the different step are performed in parallel, and the different step belongs to a same hierarchy level as the first entity.

5. A method as in claim 1 wherein:

the second entity belongs to a different hierarchy level than the first entity.

6. A non-transitory computer readable storage medium embodying a computer program for performing a method, said method comprising:

causing an engine to receive from a first entity belonging to a hierarchy, information regarding a lifecycle change of the first entity from a first status to a second status associated with an event, wherein the first entity comprises a step of a process;

in response to the information, causing the engine to reference a rule of a predefined ruleset stored in a hardware server as a database table comprising rows and columns, the rule comprising a row and a status identifier comprising a first column; and based upon the rule, causing the engine to propagate the second status to change a status of a second entity belonging to the hierarchy, wherein the second entity comprises the process and wherein:

a second column of the table comprises a new status identifier used to handle the event with specific programming comprising propagating a generic error status identifier to indicate an error for the step and another error for a different step of the process.

7. A non-transitory computer readable storage medium as in claim 6 wherein:

the first entity belongs to a lower level in the hierarchy than the second entity; and the rule calls for propagating the second status as soon as the information is received.

8. A non-transitory computer readable storage medium as in claim 6 wherein:

the first entity belongs to a lower level in the hierarchy than the second entity; and the rule calls for propagating the second status only after other entities belonging to the lower level are changed to a specific state.

9. A non-transitory computer readable storage medium as in claim 6 wherein:

the step and the different step are performed in parallel, and the different step belongs to a same hierarchy level as the first entity.

10. A non-transitory computer readable storage medium as in claim 6 wherein:

the second entity belongs to a different hierarchy level than the first entity.

11. A system comprising:

one or more processors in a first computer comprising a remote hardware database server;

a second computer in communication with the first computer through a network to communicate an occurrence of an event affecting a first database entity in the remote hardware database server;

a software program, executable on said first computer, the software program configured to:

cause an engine of the remote hardware database server to receive from the first database entity belonging to a hierarchy, information regarding a lifecycle change of the first database entity from a first status to a second status associated with the event, wherein the first database entity comprises a step of a process;

in response to the information, cause the engine to reference a rule of a predefined ruleset stored in the remote hardware database server as a database table comprising rows and columns, the rule comprising a row and a status identifier comprising a first column; and based upon the rule, cause the engine to propagate the second status to change a status of a second database entity belonging to the hierarchy, wherein the second database entity comprises the process and wherein:

a second column of the table comprises a new status identifier used to handle the event with specific programming comprising propagating a generic error status identifier to indicate an error for the step and another error for a different step of the process.

12. A system as in claim 11 wherein:

the first database entity belongs to a lower level in the hierarchy than the second database entity; and the rule calls for propagating the second status as soon as the information is received.

13. A system as in claim 11 wherein:

the first database entity belongs to a lower level in the hierarchy than the second database entity; and the rule calls for propagating the second status only after other entities belonging to the lower level are changed to a specific state.

14. A system as in claim 11 wherein:

the step and the different step are performed in parallel, and the different step belongs to a same hierarchy level as the first database entity.

15. A system as in claim 11 wherein:

the second database entity belongs to a different hierarchy level than the first database entity.

* * * * *